Dec. 20, 1955
F. KLUMPP, JR
2,727,236
APPARATUS FOR ASSEMBLING TERMINALS
WITH A TWIN CONDUCTOR CABLE
Filed June 22, 1953
7 Sheets-Sheet 1
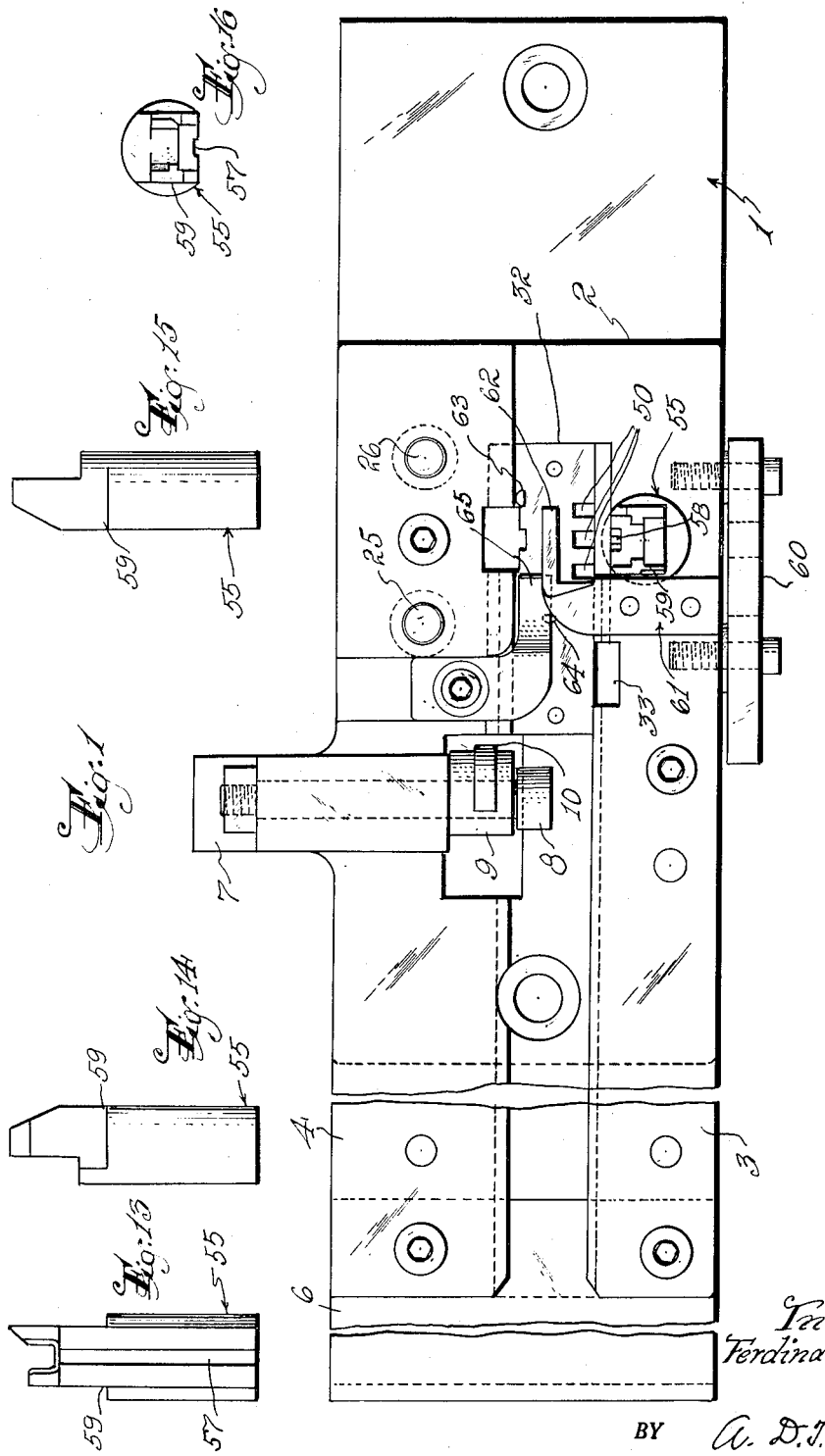
Inventor:
Ferdinand Klumpp Jr.
BY A. D. T. Libby
Attorney.

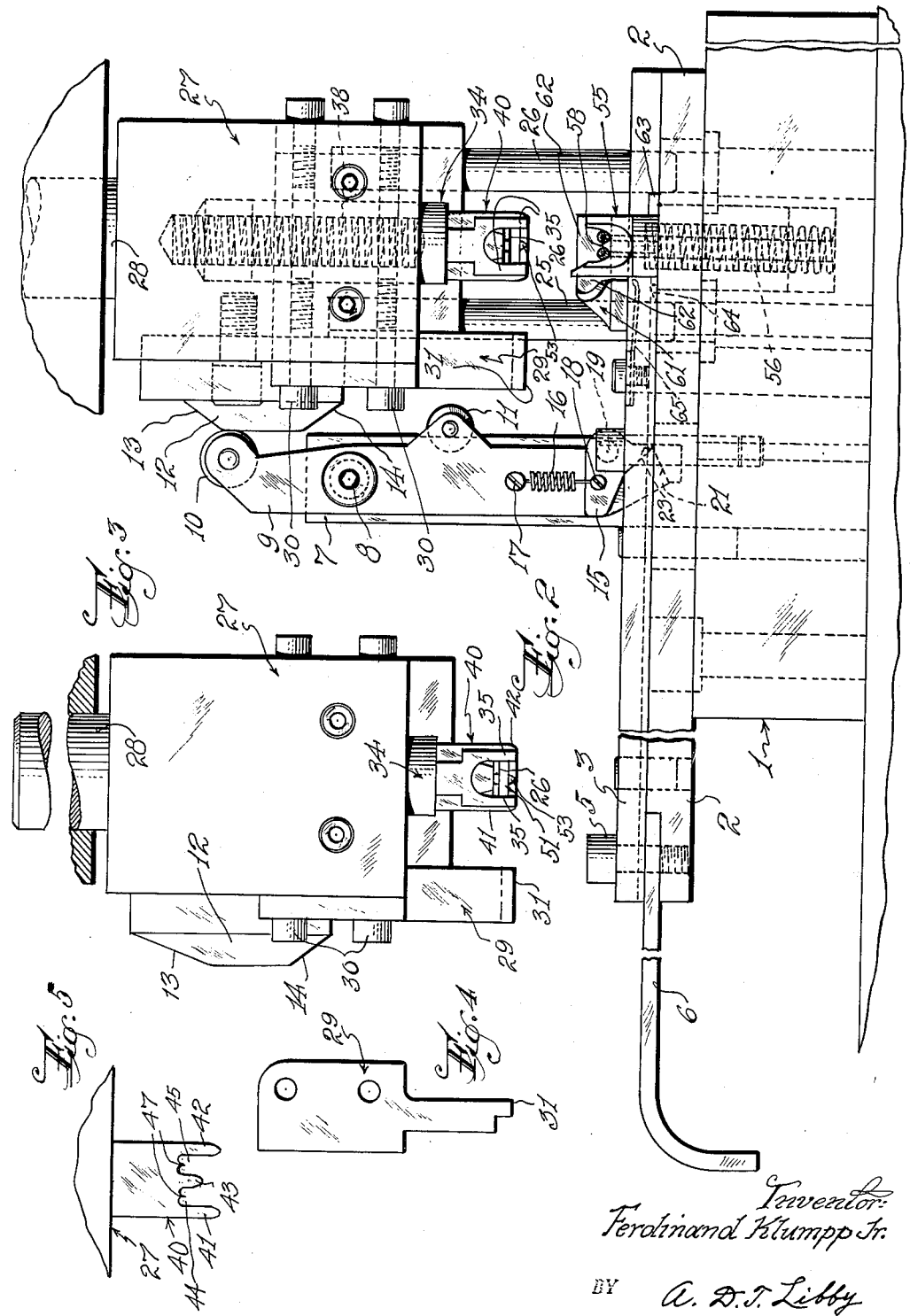

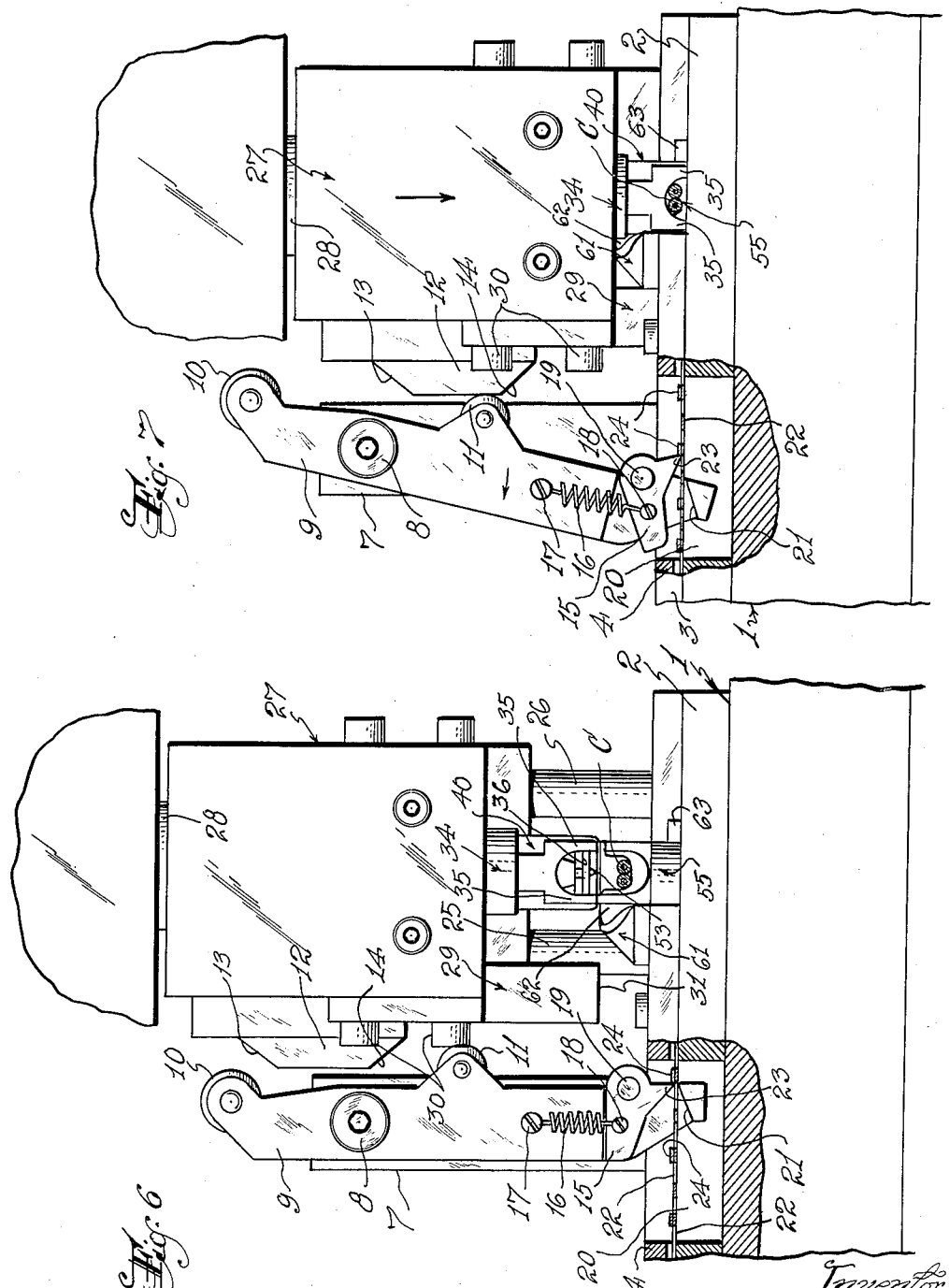

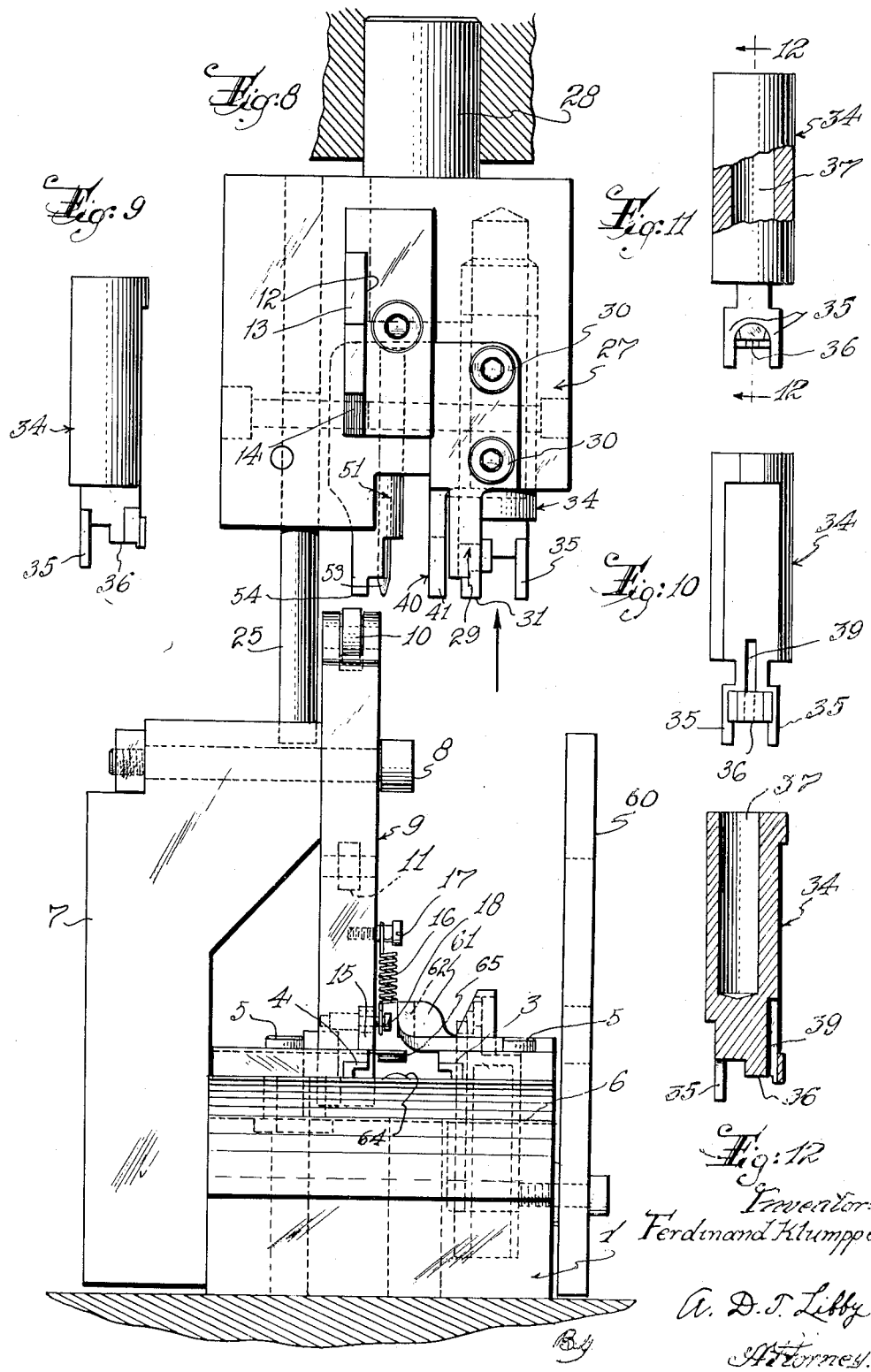

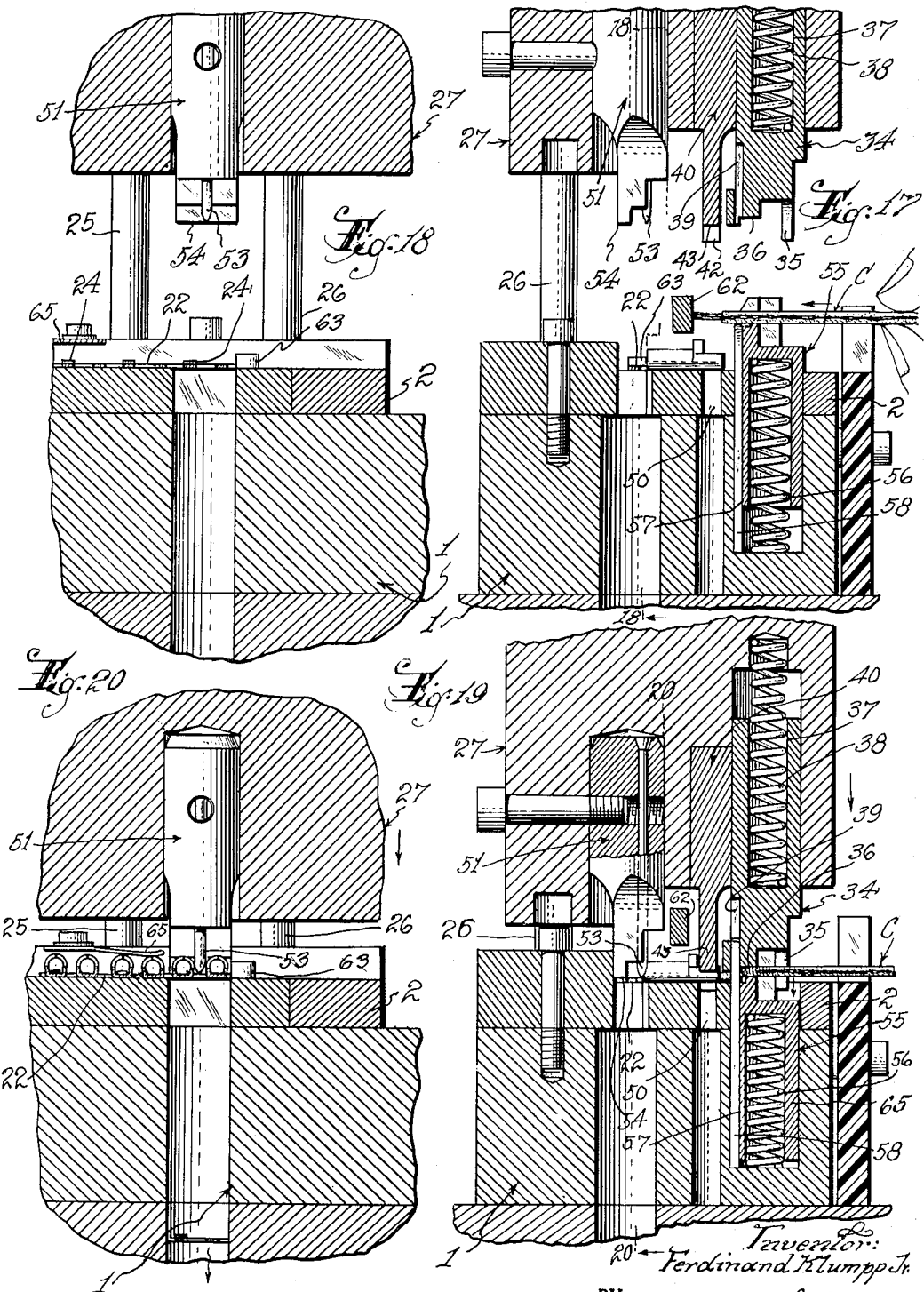

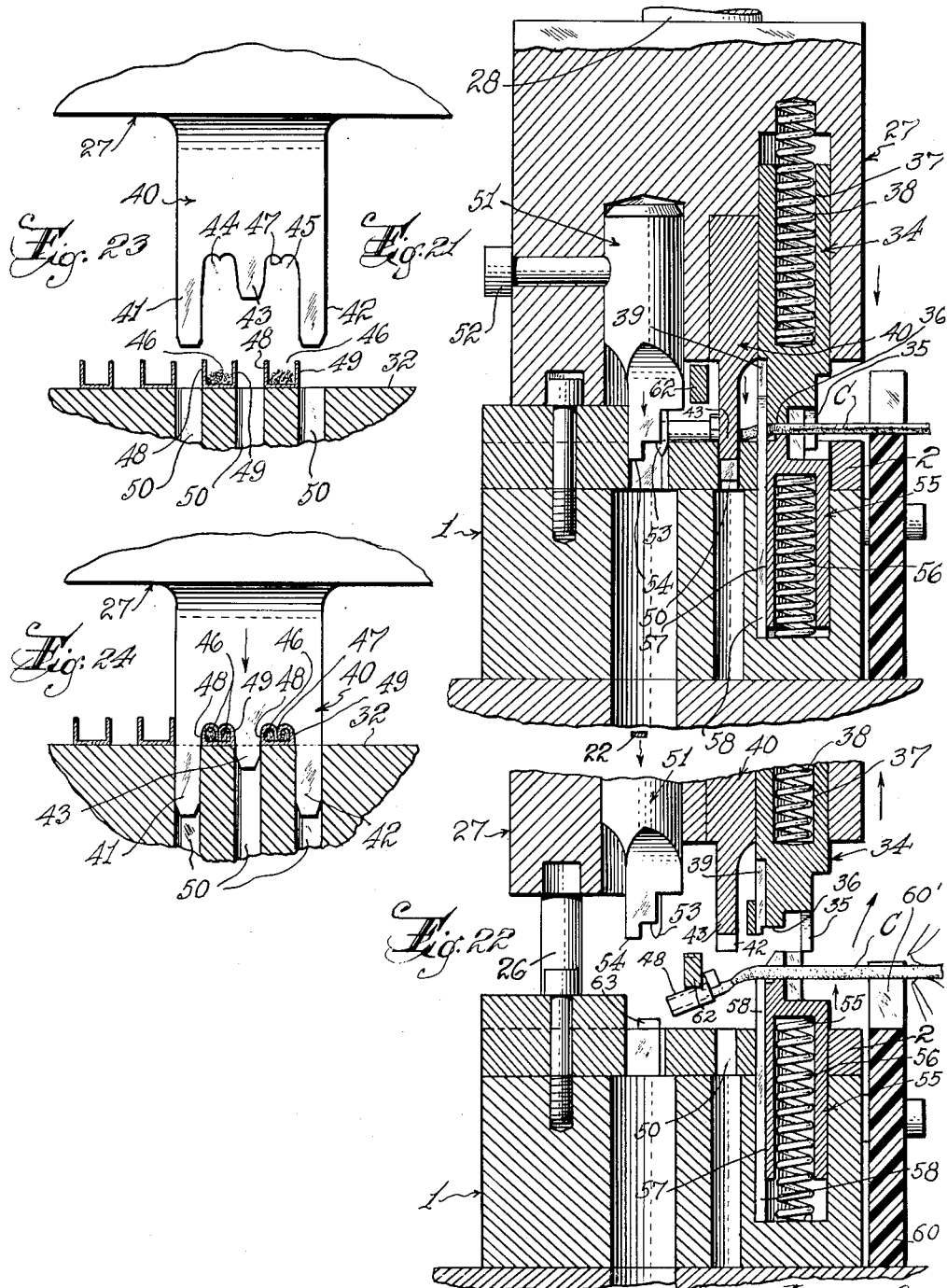

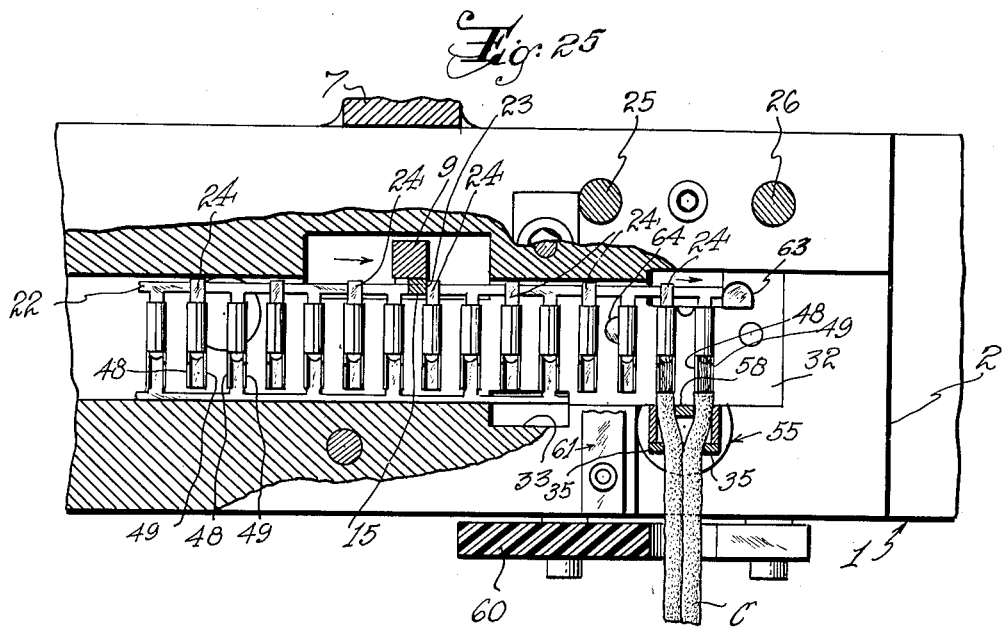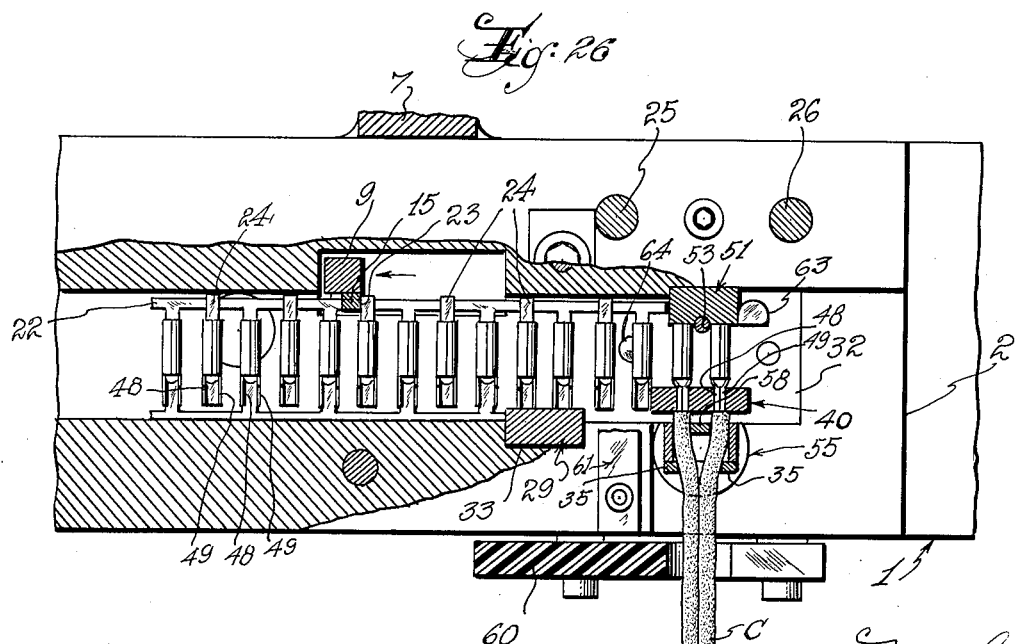

United States Patent Office 2,727,236
Patented Dec. 20, 1955

2,727,236

APPARATUS FOR ASSEMBLING TERMINALS WITH A TWIN CONDUCTOR CABLE

Ferdinand Klumpp, Jr., Union, N. J.

Application June 22, 1953, Serial No. 363,246

12 Claims. (Cl. 1—177)

This invention relates to an apparatus for assembling terminals with a twin conductor cable. In my patent application entitled "Process for Making Electrical Terminals," Serial No. 339,419, filed February 27, 1953, I have shown and described a process for making electrical conductor terminals in strip form wherein the terminals are in spaced relation held in alignment by oppositely disposed pieces, one on each side of the strip, the alternate terminals being integral with the strip on opposite sides of the terminals pointing to one edge of the strip being completely formed while the opposite ends are only partially formed to receive the barred end of the conductors of the twin cable.

My present invention has to do with the apparatus and process for assembling the conductors of the twin cable to the open ends of the terminals, this being done automatically by the apparatus to be herein described. By this apparatus and process a great amount of time is saved in the assembly operation of the twin conductor cable to the terminals which are automatically fed forwardly through the apparatus and automatically connected to the conductors of the cable without having to handle the terminals individually.

In the drawings Figure 1 is a plan view of the main part of the apparatus with one of the moving parts, used in assembly operation, being removed.

Figure 2 is a side view of Figure 1 but with the moving assembly member in one position of its operation and certain of its hidden parts being indicated in dotted lines.

Figure 3 is a front view of the movable assembly member shown in Figure 2.

Figure 4 is a side view of one of the parts forming a portion of the movable structure shown in Figure 3.

Figure 5 is a side elevation of another one of the parts for forcing the open end of the terminals around the conductor cable, as shown in Figure 3.

Figure 6 is a front view of the parts shown at the right hand end of Figure 2 but with the parts in different positions of operation.

Figure 7 is a view similar to Figure 6 but showing the parts in a different position of operation.

Figure 8 is a view of the apparatus looking from left to right of Figure 2 but with the movable member or punch structure being withdrawn above its normal working position in order to show the punch and terminal forming members.

Figure 9 is a side view of one of the members forming a part of the movable member shown in the upper part of Figure 8.

Figure 10 is a view of Figure 9 looking from right to left.

Figure 11 is a part sectional and elevational view of the member shown in Figure 9 turned 90° to the right.

Figure 12 is a view on the line 12—12 of Figure 11.

Figure 13 is a side elevation of one of the assembly members used in the base portion of the apparatus.

Figure 14 is a side view of Figure 13 turned 90° to the right.

Figure 15 is a view of Figure 13 turned 90° to the left.

Figure 16 is a top view of Figure 13.

Figure 17 is a part sectional and part elevational view showing one of the conductors of the twin cable in position ready to be assembled to its terminals.

Figure 18 is a view on the line 18—18 of Figure 17.

Figure 19 is a view similar to Figure 17 but with the parts near the completion of the assembly stroke.

Figure 20 is a view on the line 20—20 of Figure 19.

Figure 21 is a view of the parts of Figure 17 on the full assembly punch stroke.

Figure 22 is a view of the parts shown in Figure 21 right after the completion of the assembly punch stroke and showing the terminals resting against the bottom of the stop end 62, so the conductor C and its terminals can be withdrawn through the hole 60' in the guard plate 60.

Figures 23 is a view on a somewhat enlarged scale of the punch and a portion of its cooperative die which closes the open end of the terminals which are shown open on the die ready to receive the barred ends of the twin conductor cable.

Figure 24 shows the completed operation of closing the open ends of the terminals over the barred conductor ends.

Figure 25 is a plan view illustrating the position of the strip coming through the apparatus and with the twin conductor in position to be assembled through the open end of the pair of terminals, with the wire stop arm end 62 removed.

Figure 26 is a view similar to Figure 25 but showing the terminals assembled to the twin conductor ends with the formed ends of the terminals severed from their supporting strip, the open end of the terminals having had its supporting strip severed just prior to the movement of the pair of terminals into the conductor assembly position with the inner end of the wire stop arm end 62 removed.

In the various views wherein like numbers refer to corresponding parts 1 is a base member of solid substantial material such as steel carrying a mounting plate 2 with side guide members 3 and 4 guiding a strip of preformed terminals heretofore referred to in the early part of the specification. Fastened to the end of the mounting plate 2 is a side screw 5 entering guide member 6 which has a curved end for feeding the strip from a roll on to the plate 2. Fastened to the base 1 is a support 7 on which is pivotally mounted by stud 8, a pivotal arm 9 on one end of which is mounted a roller 10 and below the pivot 8 another roller 11 which will engage the cam 12 having two operating surfaces 13 and 14 for respectively engaging the rollers 10 and 11 to move the lever 9. The lower end of the lever 9 carries a pawl 15 which is operatively controlled by a spring 16 having one end fastened to a stud 17 carried by the lever 9 while the opposite end of the spring is attached to a stud 18 fastened to the pawl 15, which is pivoted at 19 on the lever 9, the lower end of which sets in a recess 20 in the base 1. This lower end of the lever 9 has an inclined surface 21, the upper end of which is adapted to engage the edge strip 22 of the strip of terminals previously referred to in column 1 of the specification. The end 23 of the pawl 15 is adapted to engage the strip 22, preferably back of the bent over ends 24 of one of the closed ends of the terminals whereby the strip is advanced two terminals at a time by actuation of the lever 9 through the medium of the cam 12 to which reference will be later made.

From the foregoing it will be noted that the base 1 carries a pair of guide pins 25 and 26 which act to support and guide a movable sliding member 27 which is supplied with a stud 28 that is fastened to a movable member of an operating machine such as a punch press.

The member 27, besides carrying the cam 12, carries a plurality of other members, one of which is 29, a shearing punch fastened to the member 27 by a pair of screw studs 30. The shearing punch 29 has a shearing edge 31 for co-operation with the die plate 32 carried by the mounted plate 2. This shearing punch passes through the die opening 33 for shearing off the edge of the strip in front of the open end of the terminals just before a pair of these terminals are moved into assembly position which will be later referred to.

The member 27 also carries a member 34 which acts to engage the cable that is to be assembled to the terminals and to guide this into position whereby the conductors may be fastened to the terminals to be later described. The member 34 has a forked arm 35 for spanning the electrical cable and a head 36 for engaging the cable and forcing it into holding position against another pad carried by the base member to which reference will be presently made. It will be noted that the member 34 has an interior hollow part 37 for carrying a spring 38 to which reference will be later made. It is also to be noted that the head 36 has a hole 39 therein to receive a fixed pin 58 carrying another co-operative member to which reference will be presently made. Carried by the member 27 adjacent to the member 34 is a forming device 40 shown on an enlarged scale in Figures 23 and 24. This device 40 has arms 41 and 42 and an interior projecting finger 43 which separates the space between the arms 41 and 42 into two parts 44 and 45 that act on the sides 48 and 49 of the open end of the terminal strip while at the same time, the edge 47 which is centrally located between the sides 48 and 49, engages the outer sides of the respective terminals and acts to guide these sides 48 and 49 downwardly over ends conductor, especially at the central part thereof as shown in Figure 24, as, the forming punch 40 moves into the openings 50 in the die plate 32.

The member 27 carries a combined aligning and shearing punch 51 fastened to the member in a suitable manner as by a screw stud 52. The punch 51 has a pin 53 which when the member 27 is moved downwardly this pin passes between two of the closed ends of a pair of terminals to hold them in spaced alignment. Then as the member 27 moves further downward its shearing edge 54, in co-operation with the die plate 32, shears off a portion of the strip 22 along the closed ends of a pair of terminals as shown in Figure 26.

Mounted in the base member 1 and extending upwardly through the plate 2 is a wire pick up device 55 shown in Figures 13–16. This device is hollow to receive a spring 56 the purpose of which will be later referred to. The device 55 has a slot 57 therein to receive a fixed pin 58 which acts to separate the two conductors of the cable sufficiently for assembly purposes with the terminals. The upper or exposed end 59 is formed to co-operate with the two parts 35 and 36 of the member 34 to grip and hold the cable while it is being assembled in the manner described with respect to Figures 23 and 24. Preferably I prefer to attach to the assembly side of the base member 1 a guard plate 60 of suitable plastic material for protecting the hand of an operator and having a suitable opening 60' therein for the insertion of the cable C. I also provide a stop member 61 that will be mounted on one end of the guide plate 3 as shown in Figure 1. The stop member 61 has an inturned arm 62 against which the barred ends of the conductor engage when the cable is pushed into assembly position as shown in Figure 22.

After the cable C has been placed in position, as has been stated, the operator actuates a mechanism which starts the press into operation whereby the stud 28 moves the member 27 downwardly as shown in Figure 21. As the parts 34 and 55 are brought into engagement the cable C is engaged and since the spring 38 is stiffer than the spring 56 the member 34 moves the cable C downwardly into the top part of the member 55 so that the pin 58 passes between the conductors and separates them into alignment with the open ends of the terminals as shown in Figure 25, by having this reciprocating action between the springs 38 and 56 by which the member 55 is moved downwardly when engaged by the member 34 the cable C is moved into assembly position without being struck a solid blow, which would not only injure its insulation but the parts themselves. As soon as the conductors are in position within the terminal receiving ends the member 40 engages the terminal ends as previously described and as shown in Figures 23 and 24, and the conductors are locked securely to the terminals and as soon as this operation is performed the member 27 is started back toward normal position carrying its various parts with it and the cable C with the terminals fastened to its conductors is withdrawn from the apparatus ready to receive another cable for assembly to its terminals which are moved forwardly by the lever 9 on the return movement of the member 27 as has been previously explained.

It should be noted that when the terminal strip is moved through the apparatus it comes against a stop 63 which may be carried on the mounting plate 2 or equivalent support. Also a back stop 64 is provided to engage the strip to prevent it from moving backward at any time such as when the pawl 15 is moved rearwardly over the strip for another forward movement of the strip. The stop 64 is preferably provided with an inclined face or bevel so the strip will move up and over the stop 64. To insure positive action at this end of the strip, a flat resilient member 65 is provided to engage the top of the strip as it is moved forward by the lever 9 and its pawl 15, and causes it to engage the stop 64.

It will be seen from the foregoing that I have provided a small and speedy apparatus for assembling the conductors to the terminal strips made according to my application previously referred to. Since these terminal strips are relatively small it would be a slow and tedious operation if they were cut off as individual terminals to assemble them onto a twin conductor cable and from what has been said it will be readily understood that this apparatus and process of operation reduces the assembly cost to a minimum. Not only that but it is done in a more efficient manner.

Having thus described my invention, what I claim is:

1. An apparatus for assembling conductor terminals made in strip form to twin conductor cables having bared ends, the terminals all having one end completely formed and the other ends open and being held in spaced relation by longitudinally extending laterally and oppositely disposed spaced parts of the original strip from which the terminals were made, said apparatus including a guide plate for receiving the terminals in said strip form, said apparatus having means for moving the strip along the guide plate in steps of two terminals, a stop on the apparatus to receive the incoming terminal strip end, a device for locating the bared ends of the twin conductor cable over the open ends of said pair of terminals, means for positioning the bared ends of said twin conductors over the open cable ends of said pair of terminals, means for clinching the open terminals ends around said bared ends of the conductors, means for then shearing off that part of the original holding strip adjacent the original closed ends of the pair of terminals being then assembled to conductors, and means for shearing off the strip holding the open ends of the next approaching pair of terminals.

2. An apparatus as set forth in claim 1 further defined in that all of said means are operated by a movable member slidably connected to said apparatus and adapted to be power driven.

3. An apparatus for assembling conductor terminals, made in strip form, to twin conductor cables including a base member with a head slidably supported on the base member and adapted to be connected to a power machine, said head carrying parts for cooperation with parts carried by the base member for shearing off a defined section on the closed terminal side of said strip, means for holding a pair of terminals in spaced relation, means for positioning the ends of said twin conductors over the spaced conductor terminals, means for moving the ends of a positioned pair of conductors of the cable downwardly into the open ends of said pair of spaced terminals, means for clinching the sides of the open ends of said pair of terminals around their respective conductor ends, means acting at the same time for shearing off the strip edge on the next approaching pair of open end terminals, and means for withdrawing the slidable member to starting position, said sliding member having a cam for engaging a lever positioned for advancing the strip another pair of terminals.

4. An apparatus and process as defined in claim 3 further defined in that a stop is provided to locate the bared ends of the conductors over the open ends of the terminals before said conductors are moved downwardly into said terminals.

5. An apparatus as set forth in claim 3 further defined in that the base member carries a hollow member having a spiral spring therewith to allow a small downward motion, when a cooperative part of said slidable member moves the cable downwardly, a fixed pointed finger engaging the conductors on their downwardly movement and acting to separate to a definite amount the conductors of the twin cable, said hollow member acting also as a guide for said finger, said cooperative part of the slidable member having a hole therein to receive the pointed end of said finger.

6. An apparatus for assembling conductor terminals to bared ends of a twin conductor cable, said apparatus including a base portion having a guideway to receive a strip of terminals arranged in cooperative pairs with a holding strip on each edge with all the terminals anchored to one edge strip while alternate terminals are not anchored to the opposite side strip, all the terminal ends that are anchored to the same strip being in circular finished form while the opposite ends are only partially formed to receive bared ends of conductors, means for passing the strip in steps of two terminals through the guideway to a forward stop, means for preventing the strip from moving backward, means for positioning a twin conductor having bared ends adjacent the open ends of the leading pair of terminals, means for shearing off the edge strip adjacent the closed end of the leading pair of terminals, means for spreading the individual conductors of the twin conductor to position them over their respective terminals, and means for forcing the bared conductor ends into their respective open terminal ends and clinching the open ends around said bared ends, and means for shearing off the strip edge on the next pair of approaching open end terminals and means for then returning all parts to initial starting position.

7. An apparatus as set forth in claim 6 further defined in that the means for passing the strip through the apparatus includes a vertically slidable member for forcing the bared ends onto their terminals with means for moving it up and down, said member having a cam located on one side, and a lever pivoted to a stationary part of the apparatus, the lever having a pair of rollers longitudinally spaced one on each side of the pivot and each roller acted on by said cam to move the ends of the lever in opposite directions, one end of the lever adapted to engage the strip edge carrying the closed terminal ends and carrying a spring controlled pawl for also engaging the strip edge to move it forward in cyclic steps.

8. An apparatus as set forth in claim 6 further defined in that the means, for locating a twin conductor in the proper place, comprises a pointed fixed pin which acts to separate the two conductors of the cable an amount defined by the axial spacing of the open ends of said terminals, a member vertically movable against a spring and having an opening at its top to receive the cable and also acting as a guide for said pin, also said means includes a fixed stop arm against which the bared ends of the conductors are placed so they are directly over the open ends of the terminals, said first mentioned shearing means including punch and die parts, while said assembly means includes a pair of slidable devices, one for engaging the bared conductor ends while the other engages the whole cable end and forces the bared ends into the open ends of said terminals and then forces these open ends over said bared conductor ends.

9. An apparatus as set forth in claim 6 further defined in that the means for locating a twin conductor in the proper place comprises a pointed fixed pin which acts to separate the two conductors of the cable an amount defined by the axial spacing of the open ends of said terminals, and a member vertically movable against a spring and having an opening at its top to receive the cable and also acting as a guide for said pin, also said means includes a fixed stop arm against which the bared ends of the conductors are placed so they are directly over the open ends of the terminals, said first mentioned shearing means including punch and die parts, while said assembly means includes a pair of slidable devices, one for engaging the bared conductor ends while the other engages the whole cable end and forces the bared ends into the open ends of said terminal and then forces these open ends over said bared conductor ends, and further defined in that said punch part carries a device for aligning the closed ends of the terminals after they have been sheared from the said edge strip, to better position the open ends of the terminals for receiving the bared conductor ends.

10. An apparatus as set forth in claim 3 further defined in that the means for assembling the bared conductor ends to the open ends of the terminals, includes a cooperative pair of hollow vertically aligned members carrying helical springs in their hollow parts, one member being mounted in the base member and having a relatively short movement downwardly when engaged by the other member whose spring is stiffer than the spring in the base mounted member which acts to receive and help position the cable end, while the joint action of the two springs is such as to avoid a positive hard stop which would injure the cable and apparatus.

11. An apparatus for assembling a twin conductor cable to terminals supplied in strip form, said apparatus having a base member carrying a plate for receiving the terminal strip having terminals completely formed at one end and partially formed at the opposite end, a punch member slidable on the base member and means for sliding it, said apparatus having parts to properly locate a cable having bare conductor ends, said punch member having means cooperating with the locating parts to move the cable into a position whereby the bare conductor ends are moved into the partially formed terminal ends, said punch member having means for securing the terminal ends to the base conductor ends and further parts for severing the terminals from the strip form on completion of the terminal and conductor assembly, and means actuated by movement of the punch member for moving the terminal strip forwardly for successive cable connection to the terminals.

12. An apparatus for assembling a twin conductor cable to terminals as set forth in claim 11, further defined in that a device is positioned on a suitable support to stop the forward movement of the terminal strip and a further stop means comprising a fixed device to engage the strip and a resilient member acting downwardly on the strip to cause it to engage said further stop means to prevent the strip from moving backward after having reached the first mentioned stop.

(References on following page)

References Cited in the file of this patent

UNITED STATES PATENTS

| | | |
|---|---|---|
| 228,874 | Coop | June 15, 1880 |
| 1,133,862 | Hullings | Mar. 30, 1915 |
| 2,024,416 | Allison | Dec. 17, 1935 |
| 2,536,779 | Stearns | Jan. 2, 1951 |
| 2,542,213 | Schwarcz | Feb. 20, 1951 |
| 2,592,276 | Hackfarth | Apr. 8, 1952 |
| 2,613,427 | Adams et al. | Oct. 14, 1952 |
| 2,622,874 | Haller | Dec. 23, 1952 |
| 2,631,213 | Martines | Mar. 10, 1953 |
| 2,668,950 | Bohaboy et al. | Feb. 16, 1954 |
| 2,690,562 | Cootes | Oct. 5, 1954 |